US012150154B2

(12) United States Patent
Nordström et al.

(10) Patent No.: US 12,150,154 B2
(45) Date of Patent: Nov. 19, 2024

(54) BIT RATE SCHEDULING FOR A USER EQUIPMENT

(71) Applicant: Telefonaktiebolaget LM Ericsson (publ), Stockholm (SE)

(72) Inventors: Björn Nordström, Hässelby (SE); Göran Hansson, Stockholm (SE); Magnus Persson, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 49 days.

(21) Appl. No.: 17/761,776

(22) PCT Filed: Sep. 24, 2019

(86) PCT No.: PCT/SE2019/050911
§ 371 (c)(1),
(2) Date: Mar. 18, 2022

(87) PCT Pub. No.: WO2021/061029
PCT Pub. Date: Apr. 1, 2021

(65) Prior Publication Data
US 2022/0377763 A1    Nov. 24, 2022

(51) Int. Cl.
*H04W 72/12*     (2023.01)
*H04W 28/02*     (2009.01)
*H04W 72/1273*   (2023.01)
*H04W 72/50*     (2023.01)

(52) U.S. Cl.
CPC ..... *H04W 72/535* (2023.01); *H04W 28/0242* (2013.01); *H04W 28/0257* (2013.01); *H04W 28/0268* (2013.01); *H04W 28/0278* (2013.01); *H04W 72/1273* (2013.01)

(58) Field of Classification Search
None
See application file for complete search history.

(56) References Cited

U.S. PATENT DOCUMENTS

2017/0026982 A1*  1/2017  Koskinen .............. H04W 72/12
2022/0377763 A1* 11/2022  Nordström ............ H04W 76/15

OTHER PUBLICATIONS

International Search Report and Written Opinion dated May 12, 2022 for International Application No. PCT/SE2019/050911 filed Sep. 24, 2019, consisting of 12-pages.
Erik Westerberg; 4G/5G RAN Architecture How a Split Can Make the Difference; Ericsson Technology Review, vol. 93, No. 6; Jul. 22, 2016, consisting of 16-pages.

(Continued)

*Primary Examiner* — Kouroush Mohebbi
(74) *Attorney, Agent, or Firm* — Weisberg I.P. Law, P.A.

(57) ABSTRACT

The present disclosure provides systems and methods for scheduling transmissions to and/or transmissions from user equipment. The user equipment communicates with a network via a first radio processing function (RPF) and a second RPF. The method includes determining a first aggregate bit rate for the UE. The method provides for sending to the first RPF first aggregate bit rate information (ABRI) for the UE. The first ABRI: 1) indicates that the first aggregate bit rate satisfies a bit threshold condition, 2) indicates that the first aggregate bit rate does not satisfy the condition, or 3) identifies the determined first aggregate bit rate for the UE.

19 Claims, 9 Drawing Sheets

(56) References Cited

OTHER PUBLICATIONS

3GPP TS 36.423 V15.5.0; 3rd Generation Partnership Project; Technical Specification Group Radio Access Network; Evolved Universal Terrestrial Radio Access Network (E-UTRAN); X2 application protocol (X2AP) (Release 15); Mar. 2019, consisting of 414-pages.
3GPP TS 38.413 V15.3.0; 3rd Generation Partnership Project; Technical Specification Group Radio Access Network; NG-RAN; NG Application Protocol (NGAP) (Release 15); Mar. 2019, consisting of 319-pages.
3GPP TS 38.463 V15.3.0; 3rd Generation Partnership Project; Technical Specification Group Radio Access Network; NG-RAN; E1 Application Protocol (E1AP) (Release 15); Mar. 2019, consisting of 165-pages.
3GPP TS 38.473 V15.5.0; 3rd Generation Partnership Project; Technical Specification Group Radio Access Network; NG-RAN; F1 Application Protocol (F1AP) (Release 15); Mar. 2019, consisting of 198-pages.

* cited by examiner

BIT RATE SCHEDULING FOR A USER EQUIPMENT

CROSS-REFERENCE TO RELATED APPLICATION

This application is a Submission Under 35 U.S.C. § 371 for U.S. National Stage Patent Application of International Application Number: PCT/SE2019/050911, filed Sep. 24, 2019 entitled "BIT RATE SCHEDULING FOR A USER EQUIPMENT," the entirety of which is incorporated herein by reference.

TECHNICAL FIELD

This disclosure relates to a communication system that employs bit rate scheduling.

BACKGROUND

A distributed radio access network (RAN) architecture typically include the following functional entities: (1) a radio control function (RCF), (2) a packet processing function (PPF), and (3) a radio processing function (RPF).

Typically, the RCF terminates a control plane signaling interface towards a core network (CN). Via the control plane interface, the RCF receives requests to set up Radio Access Bearers (RABs) for use in the transport of user data from and to a user equipment (UE).

Typically, the PPF terminates a user plane interface towards the CN. The PPF handles processing of the protocols used for transport of RAB data (1) between the CN and the PPF, and (2) between the PPF and the RPF. Further, the PPF handles processing for the upper part of the protocols used to transport user data between the PPF and a User Equipment (UE) over a radio interface.

Typically, the RPF handles processing of the protocols used for transport of user data between the PPF and the RPF, and the lower layer protocols used for transport of user data between the RPF and a user equipment (UE) over a radio interface. This also includes scheduling of radio resources over the air interface. As used herein a UE is a communication device capable of wireless transmission with an RPF. Examples of a UE includes: smartphone, sensor, vehicle, appliance, etc.

In addition to the functionality discussed above with respect to the RCF, the RCF further controls set up and release of RABs, including packet processing functions for the RABs, in the PPF and the RPF.

In some conventional core networks, Non Stand Alone (NSA) deployment with New Radio (NR) is used. NSA with NR controls a UE from an LTE eNodeB using Radio Resource Control (RRC) Signaling. In some conventional core networks, the RAB has two radio carriers for user data transport from both the LTE eNodeB and an NR gNodeB (e.g., a first radio carrier associated with the eNodeB and a second radio carrier associated with the gNodeB). The RAB data flow is split between the two radio carriers, in a PPF function, for data sent from the CN to the UE (Down Link (DL) data). When data is sent from the UE to the CN (Up Link (UL) data), the data is aggregate in a PPF function from the two radio carriers. A RAB set up with two radio carriers in this way is herein referred to as a split bearer.

Conventional core networks rely on minimum bit rate scheduling to maintain quality of service (QoS) for the UL and DL data. Each network can have several QoS classes, and each class can have a minimum bit rate to fulfill. The medium access control (MAC) Layer in the RPF monitors the bitrates for all RABs. If the bit rates are above the defined minimum bit rate for a given QoS class, all bearers are scheduled with the same priority in a round robin scheme. If the bit rate goes below the minimum bit rate for a bearer, that bearer will be scheduled with an elevated priority, so that the minimum bit rate can be maintained. The elevated priority to use is specified per QoS class. In some examples, the bit rate for a bearer goes below the minimum bit rate because of a high load or because the UE is in an area with bad radio conditions.

SUMMARY

Conventional bit rate scheduling, as described above, does not adequately account for split bearers (e.g., the RAB) having two radio carriers. The MAC layer in an RPF provides a minimum bit rate scheduling function which schedules each radio carrier for a split bearer separately, without considering the aggregate bit rate over both radio carriers for the RAB.

In some examples, this results in the MAC scheduler elevating the priority for a particular split bearer leg because the MBR is not reached for that particular leg; however, a total, aggregate bit rate for the entire RAB (e.g., a combined bit rate for both the first RPF and the second RPF) is above the minimum bit rate defined for the relevant QoS class.

In some examples, the radio reception at the UE for one radio carrier/split bearer leg is temporarily disturbed, while the radio reception for the other radio carrier/split bearer leg is still good. The MAC layer on the RPF will then schedule the radio carrier with bad reception with an elevated priority. It is costly from a radio resource point of view to schedule a radio carrier with an elevated priority; and it is especially costly when the connected UE has bad radio reception. This scheduling of the radio carrier with bad reception as an elevated priority consumes radio resources from other radio carriers/RABs who do not have adequate reception from either leg, or are otherwise below the minimum bit rate scheduling.

Therefore, the present disclosure provides systems and methods for monitoring the aggregate bit rate over both bearer legs for split bearers. An exemplary methodology is performed in the PPF (e.g., in the Packet Data Convergence Protocol (PDCP) or NR-U part of the PPF), where the split and the aggregation of data flows for split bearer RABs takes place. An exemplary PPF provides aggregate bit rate information (ABRI) (e.g., an indicator) to the RPF, which indicates whether the determined aggregate bit rate is below the minimum bit rate. If the PPF indicates that the aggregate bit rate for a RAB is not below the minimum bit rate, the RPF does not apply the minimum bit rate scheduling procedure. For example, the control signaling is performed by appending control bits in user data packets ("in-band signaling") in the X2-U interface, when sending towards the MeNB, and in the F1-U interface, when sending towards the SgNB. By using in-band signaling capacity, control plane signaling via the E1 and F1-C interfaces is not consumed by the disclosed systems and methods.

In some examples, the disclosed methods are applied for (1) both split bearer legs, (2) just for the NR leg, or (3) just for the LTE leg.

Therefore, the disclosed minimum bit rate scheduling function does not unnecessarily elevate the priority for a radio carrier/split bearer leg when an aggregate bit rate for both radio carriers/split bearer legs is above the minimum bit rate. Consequently, the concerned radio bearer does not increase its resource consumption at the expense of other radio carriers.

Accordingly, there is provided a method for use in scheduling transmissions to and/or transmissions from a UE. The UE is able to communicate with a network via a first RPF and a second RPF that is separate from the first RPF. The method includes determining a first aggregate bit rate for the UE; and sending to the first RPF first aggregate bit rate information (ABRI) for the UE, wherein the first ABRI i) indicates that the first aggregate bit rate satisfies a bit rate threshold condition, ii) indicates that the first aggregate bit rate does not satisfy the bit rate threshold condition, or iii) specifies the determined first aggregate bit rate for the UE.

In some examples, after determining the first aggregate bit rate, the method further provides for comparing the first aggregate bit rate to a bit rate threshold.

In some examples, the first aggregate bit rate is an uplink, UL, aggregate bit rate. The method further provides for receiving, from the first RPF, a first protocol data unit, PDU. The first PDU includes user data that was transmitted by the UE. The method then provides for receiving, from the second RPF, a second PDU. The second PDU includes user data that was transmitted by the UE. For example, determining the first aggregate bit rate includes (1) determining the amount of user data included in the first PDU; (2) determining the amount of user data included in the second PDU; and (3) using the determined amounts of user data in calculating the aggregate bit rate.

In some examples, the aggregate bit rate is determined based on an exponential moving average method.

In some examples, the aggregate bit rate is determined based on (1) receiving a first bit rate from the first RPF, (2) receiving a second bit rate from the second RPF; and (3) determining the aggregate bit rate based on the first bit rate and the second bit rate.

In one embodiment of the present disclosure, a computer program product is contemplated, which includes a non-transitory computer readable medium storing a computer program for scheduling transmissions to and/or transmissions from a UE. The computer program includes computer program code which, when run on a packet processing function, cause the packet processing function to perform the method described above and any of the examples described above.

In one embodiment of the present disclosure, a packet processing function is contemplated, which schedules transmissions to and/or transmissions from a UE. The packet processing function includes a processor and a memory. The memory stores instructions that, when executed by the processor, cause the packet processing function to perform the method and any of the examples described above.

In another aspect there is provided a method, performed by an RPF, for use in scheduling transmissions to and/or transmissions from a UE. The method includes receiving a protocol data unit, PDU, comprising DL user data for the UE and first aggregate bit rate information, ABRI, for the UE; and scheduling, based on the first ABRI, at least one of an uplink, UL, transmission from the UE or a downlink, DL, transmission to the UE, wherein i) the first ABRI indicates that an aggregate bit rate for the UE satisfies a bit rate threshold condition, ii) the first ABRI indicates that the aggregate bit rate for the UE does not satisfy the bit rate threshold condition, or iii) the first ABRI for the UE specifies the first aggregate bit rate for the UE In one embodiment of the present disclosure, a computer program product is provided, which includes a non-transitory computer readable medium storing a computer program for scheduling transmissions to and/or transmissions from a UE. The computer program includes computer program code which, when run on a radio processing function, cause the radio processing function to perform the method and examples described above.

In one embodiment of the present disclosure, a radio processing function is contemplated, which schedules transmissions to and/or transmissions from a UE. The radio processing function includes a processor and a memory. The memory stores instructions, that, when executed by the processor, cause the radio processing function to perform the method and any of the examples described above.

Advantages

The embodiments described herein enable an RPF to avoid unnecessarily elevating the priority for a split bearer leg for a UE where the bit rate for the split bearer leg for the UE is below a minimum bit rate. This enables cost efficiency from a radio resource point of view and avoids a radio bearer incorrectly increasing its resource consumption at the expense of other radio carriers.

BRIEF DESCRIPTION OF THE DRAWINGS

The accompanying drawings, which are incorporated herein and form part of the specification, illustrate various embodiments.

DETAILED DESCRIPTION

Figure 1:
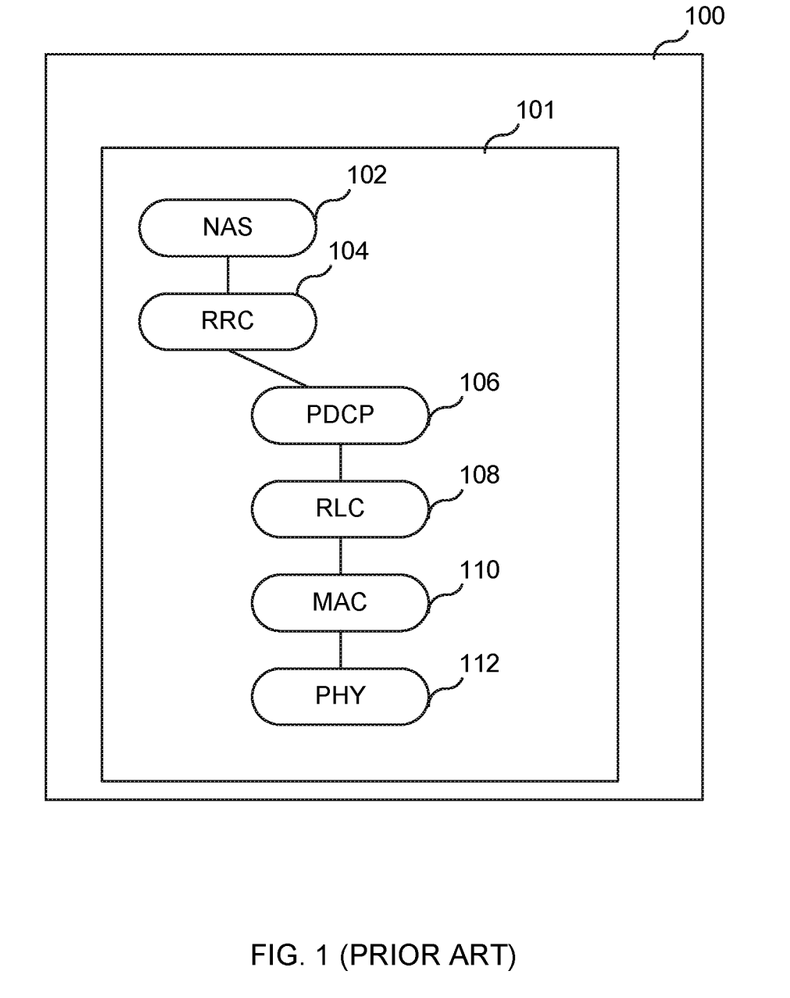
FIG. 1 illustrates an example protocol stack.

FIG. 1 illustrates an example protocol stack 101 of a wireless communication device (WCD) 100 (e.g., UE or access point), which protocol stack includes: Non-Access Stratum (NAS) layer 102; Radio Resource Control (RRC) layer 104; Packet Data Convergence Protocol (PDCP) layer 106; Radio Link Control (RLC) layer 108; Media Access Control (MAC) layer 110; and a Physical (PHY) layer 112. In an example, RLC layer 108 may support multiple transmission modes (e.g., transparent mode (TM), unacknowledged mode (UM), etc.). The RLC configuration may be per logical channel. In an example, PDCP layer 106 for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, etc. RRC layer 104 and NAS layer 102 are control plane layers.

Figure 2:
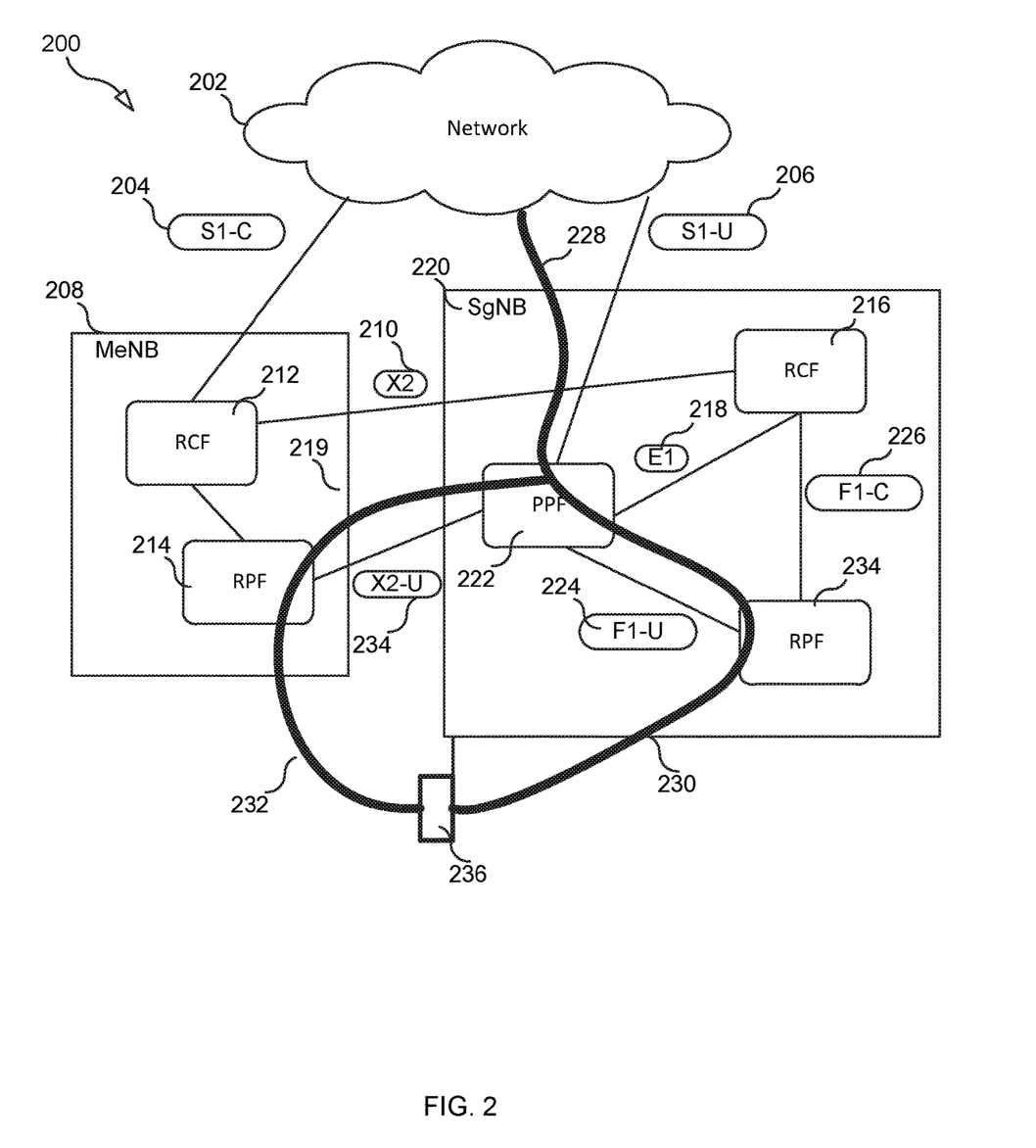
FIG. 2 illustrates an exemplary network system for bit rate scheduling, according to one embodiment.

FIG. 2 illustrates an exemplary network system 200 for bit rate scheduling, according to one embodiment. Network system 200 includes a core network 202, an LTE base station (denoted eNB) 208 in communication with a user equipment (UE) 236, and 5G base station (denoted gNB) 220 in communication with the UE 236. In this example, the eNB 208 functions as a master eNB (MeNB) and the gNB 220 functions as a secondary base station (SgNB). MeNB 208 comprises a first RPF 214 and a first RCF 212. SgNB 220 comprises a PPF 222, a second RPF 234; and a RCF 216. Network system 200 enables UE 236 to send communications to and receive communications from the core network 202 via a first radio interface with RPF 214 and via a second radio interface with RPF 234.

The core network 202 is configured to communicate with the first RCF 212 of the Master eNodeB 208 via an S1-C interface 204. For example, the S1-C interface 204 provides control plane signaling to the core network 202. The core network 202 is further configured to communicate with the PPF 222 of the secondary gNodeB 220 via an S1-U interface 206. For example, the S1-U interface 206 provides a user plane interface to the core network 202.

The Master eNodeB 208 determines (e.g., based on control signaling from the core network) when to set up a split bearer for UE 236 and uses the X2 interface 210 to coordinate the split bearer with the second RCF 216 of the SgNB 220. In this example, a split bearer has been established for UE 236, and the first RPF 214 controls sending communications to and receiving communications from the UE 236 via a first radio interface that forms part of a first communication path 232 (a.k.a., first leg of the split bearer) between UE 236 and PPF 222, and the first RPF 234 controls sending communications to and receiving communications from the UE 236 via a second radio interface that forms part of a second communication path 230 (a.k.a., second leg) between UE 236 and PPF 222.

That is, for example, in the UL, first RPF 214 receives UL PDUs transmitted by UE 236 and provides these UL PDUs to PPF 222. Similarly, in the UL, second RPF 234 receives UL PDUs transmitted by UE 236 and provides these UL PDUs to PPF 222. In the DL direction, PPF 222 receives PDUs (e.g., IP packets) addressed to UE 236 and, for each such PDU, forwards the at least the payload of the PDU to one of RPF 214 or RPF 216. In some embodiments PPF 22 evenly splits such DL traffic for the UE (i.e., for the particular bearer) between RPF 214 and RPF 216.

The RCF 216 uses the E1 interface 218 to control the PPF 222. For example, the second RCF 216 receives requests to set up split bearers (RABs). The second RCF 216 thereby controls the PPF 222 according to the request.

The PPF 222 is configured to receive instructions from the second RCF 216. The PPF 222 is further configured to terminate control plane signaling between the UE 236 and the control network 202 via the S1-U interface 206. When a split bearer (RAB) is set up in the PPF 222, according to the control instructions of the RCF 216, the PPF 222 splits or aggregates data accordingly.

In some examples of system 200, various elements are implemented as separate nodes in a cloud implementation. For example, any of the first RCF 212, the first RPF 214, the second RCF 216, the second RPF 234, and the PPF 222 are virtualized in various embodiments of the present disclosure.

Figure 3:
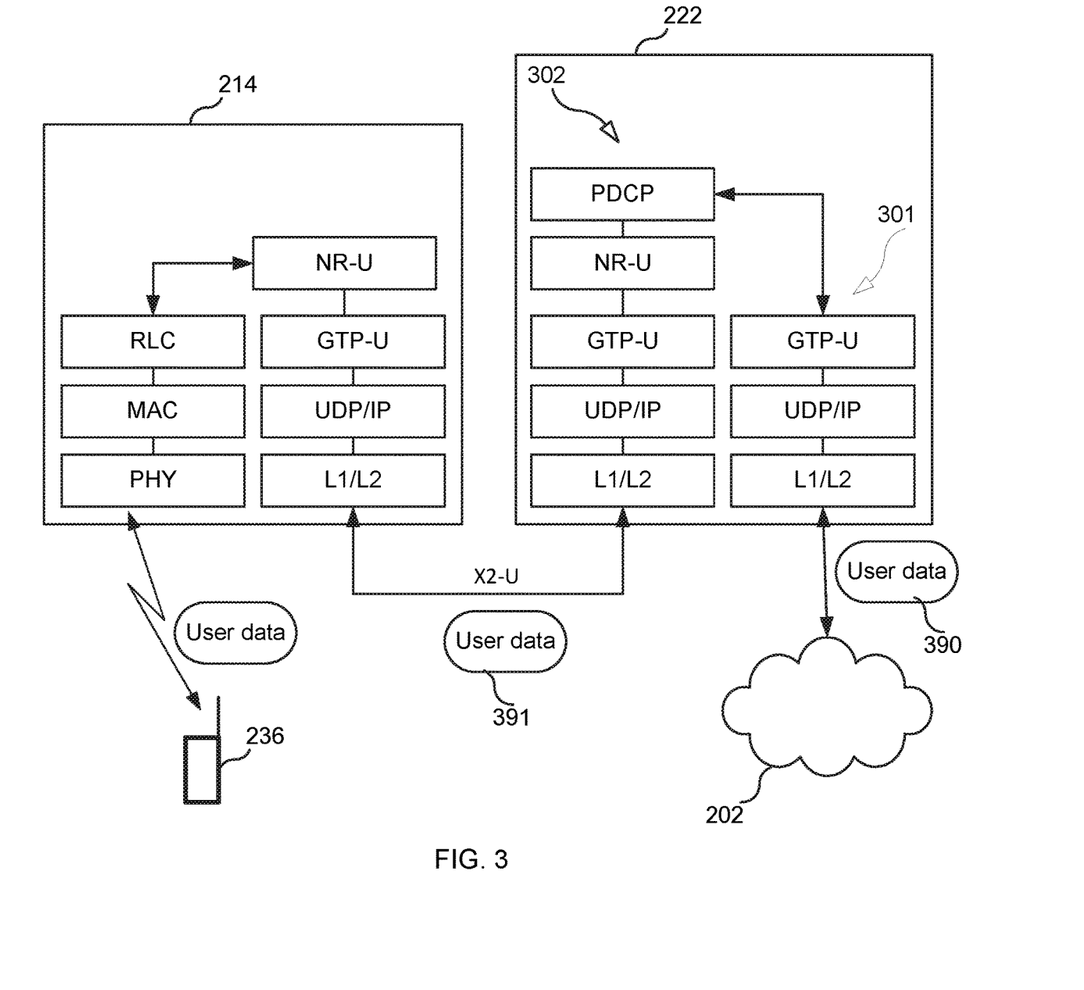
FIG. 3 illustrates an exemplary PPF and RPF.

FIG. 3 illustrates PPF 222 and RPF 214 according to an embodiment. PPF 222 includes a first protocol stack 301 that is used for, among other things, receiving from the core network a packet 390 comprising user data for the UE. In the example, shown packet 390 is a GTP-U PDU that contains an Internet Protocol (IP) PDU that contains the user data.

The GTP-U layer provides the IP packet to a second protocol stack 302 of PPF 222. Second protocol stack 302 includes, among other layers, a PDCP layer and an New Radio (NR) user plane (UP) (NR-U) layer. Second protocol stack 302 functions to transmit the user data from packet 390 to RPF 214. In this example, Second protocol stack 302 generates packet 391 that includes the user data (in some embodiments the user data is included in packet 391 in encrypted form). Packet 391 includes an NR-U PDU that includes an NR-U header and a payload that comprises a PDCP PDU that includes the user data.

Figure 4:
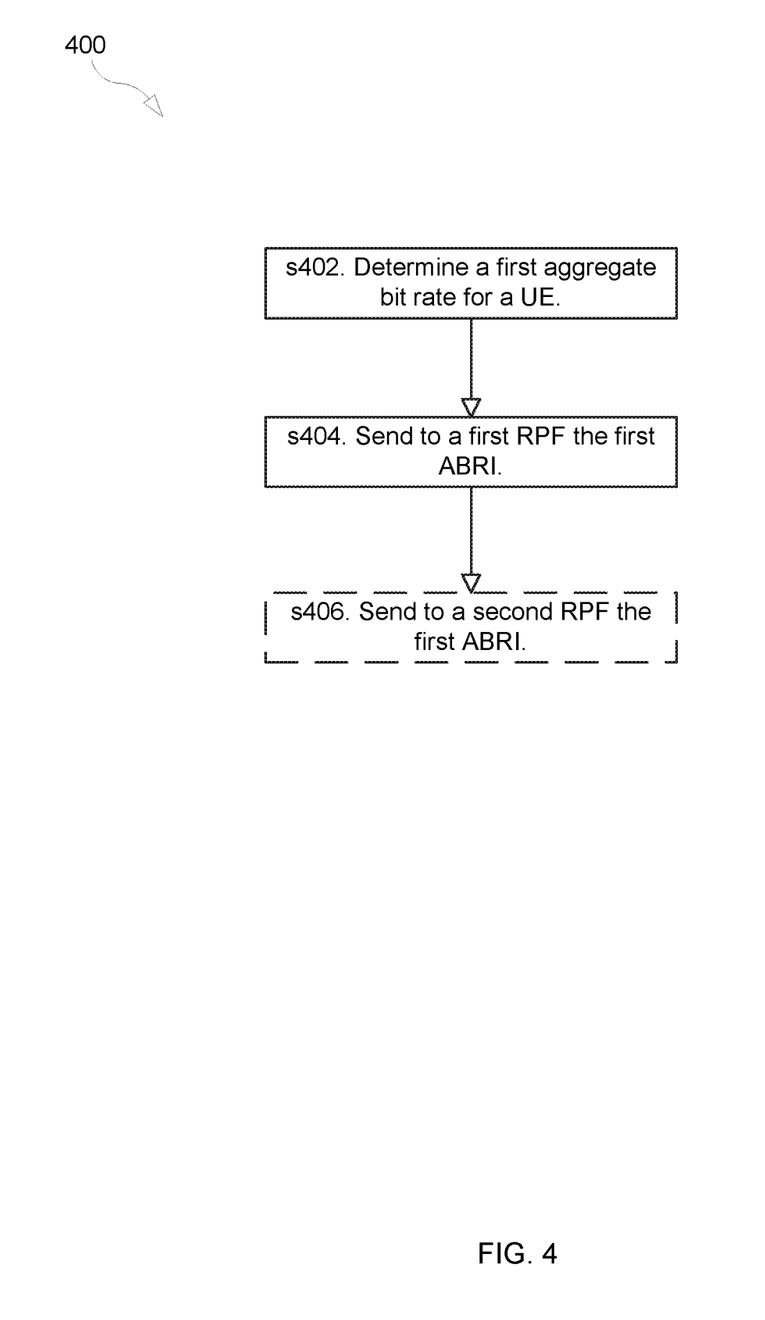
FIG. 4 is an exemplary flowchart illustrating a process, according to one embodiment.

FIG. 4 is an exemplary flowchart illustrating a process 400, according to one embodiment, for use in scheduling transmissions to and/or transmissions from UE 236. Process 400 is performed by PPF 222. Process 400 may begin at step s402.

Step s402 comprises PPF 222 determining a first aggregate bit rate (ABR) (e.g., a DL aggregate bit rate or an UL aggregate bitrate) for UE 236. More specifically, the first ABR is for a specific split bearer associated with the UE.

Step s404 comprises PPF 222 sending first ABR information (ABRI) to a first RPF (e.g., RPF 214 or RPF 234). In some examples, the first ABRI: i) indicates that the determined first aggregate bit rate satisfies a bit rate threshold condition, ii) indicates that the determined first aggregate bit rate does not satisfy the bit rate threshold condition, or 3) specifies the determined first aggregate bit rate (e.g., the ABRI consists of a bit rate value—e.g., 100 Mb). With respect to options (1) and (2) the first ABRI may be a TRUE or FALSE indicator (e.g., a one bit flag). Step s406 (optional) comprises sending the first ABRI to a second RPF (e.g., RPF 214 or RPF 234). In this way, the disclosed process 400 provides information which assists separate RPFs in scheduling communications for the same UE.

In one embodiment, the determined first aggregate bit rate satisfies the bit rate threshold condition only when the determined first aggregate bit rate is less than an MBR.

In another embodiment, the determined first aggregate bit rate satisfies the bit rate threshold condition only when the determined first aggregate bit rate is less than or equal to the MBR.

In some embodiments, between performing step s402 and s404, PPF 222 compares the determined aggregate bit rate to a bit rate threshold to determine the first ABRI. For example, the bit rate threshold is a minimum bit rate threshold or a maximum bit rate threshold corresponding to a QoS associated with the UE. In one embodiment the ABRI consists of a single bit and PPF 222 sets the value for the bit based on the outcome of the comparison—e.g., if the aggregate bit rate is greater than the threshold, the flag is set to 1, otherwise the value of the flag is set to 0.

In some embodiments, the first aggregate bit rate is an UL aggregate bit rate. In such an embodiment process 400 may further include: i) PPF 222 receiving from RPF 214 a first PDU (e.g., an NR-U PDU) comprising user data that was transmitted by UE 236 and ii) PPF 222 receiving from RPF 234 a second PDU (e.g., an NR-U PDU) comprising user data that was transmitted by UE 236. PPF 222 determines the UL aggregate bit rate by: determining the amount of user data included in the first PDU, determining the amount of user data included in the second PDU, and using the determined amounts of user data in calculating the aggregate bit rate (ABR)—e.g., ABR=ABR+UD1+UD2, where UD1 is the determined amount of user data included in the first PDU and UD2 is the determined amount of user data included in the first PDU. In some embodiments, the aggregate bit rate is determined based on an exponential moving average method.

In other embodiments, PPF 222 receives first bit rate information (BRI) from RPF 214 and second BRI from RPF 234, and PPF 222 determines the ABR based on the first BRI received from RPF 214 and the second BRI received from RPF 214, where the first BRI from RPF 214 specifies a bit rate for UE 236 determined by RPF 214 and the second BRI from RPF 234 specifies an bit rate for UE 236 determined by RPF 234.

In some embodiments, process 400 also includes PPF 222 receiving a first PDU addressed to the UE and comprising user data. After receiving the first PDU, PPF 222 generates a second PDU comprising the user data and the first ABRI for the UE. In such an embodiment sending the first ABRI for the UE to the first RPF comprises sending to the first RPF the second PDU comprising the user data and the first ABRI for the UE. In some embodiments, the first PDU is IP PDU comprising an IP header and a payload, wherein the payload comprises the user data. In some embodiments, the second PDU is a NR-U PDU comprising a header that contains the ABRI for the UE and a payload that comprises a PDCP PDU that contains the user data.

In some embodiments process 400 also includes PPF 222 receiving a first PDU addressed to the UE and comprising user data and determining a DL aggregate bit rate based on the amount of user data included in the first PDU. The method may also include the PPF 222 generating second ABRI for the UE, wherein i) the second ABRI for the UE indicates that the DL aggregate bit rate is less than (or less than or equal to) a DL bit rate threshold, ii) the second ABRI for the UE indicates that the DL aggregate bit rate is greater than (or greater than or equal to) the DL bit rate threshold, or iii) the second ABRI for the UE specifies the determined DL aggregate bit rate for the UE, and a PDU transmitted by the PPF to the first RPF comprises the user data, the first ABRI for the UE, and the second ABRI for the UE.

In some embodiments, process 400 also includes: i) the PPF 222 determining that no DL packets for the UE have been received within the last X units of time, wherein X is a predetermined number; and ii) the PPF 222, as a result of determining that no DL packets for the UE have been received within the last X units of time, generating a PDU that contains UL ABRI for the UE but that does not contain any user data for the UE and transmitting the generated PDU to the first RPF, wherein i) the UL ABRI indicates that a calculated UL aggregate bit rate for the UE is less than (or less than or equal to) an UL bit rate threshold, ii) the UL ABRI indicates that the calculated UL aggregate bit for the UE rate is greater than (or greater than or equal to) the UL bit rate threshold, or iii) the UL ABRI specifies the calculated UL aggregate bit rate for the UE.

Figure 5:
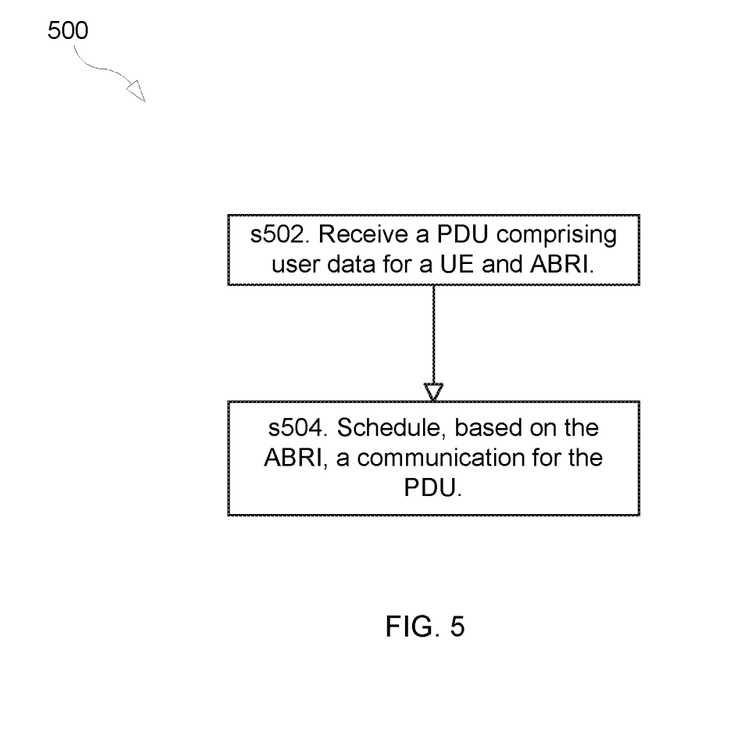
FIG. 5 is an exemplary flowchart illustrating a process, according to one embodiment.

FIG. 5 is a flowchart illustrating a process 500, according to an embodiment, for use in scheduling transmissions to and/or transmissions from UE 236. Process 500 may be performed by RPF 214 and/or RPF 234. Process 500 begins in step s502.

Step s502 comprises receiving a PDU comprising DL user data for the UE and first aggregate bit rate information, ABRI, for the UE. The first ABRI i) indicates that an aggregate bit rate for the UE satisfies a first bit rate threshold condition, ii) indicates that the aggregate bit rate for the UE does not satisfy the first bit rate threshold condition, or iii) specifies the first aggregate bit rate for the UE. In one embodiment, the determined first aggregate bit rate satisfies the bit rate threshold condition only when the determined first aggregate bit rate is less than an MBR. In another embodiment, the determined first aggregate bit rate satisfies the bit rate threshold condition only when the determined first aggregate bit rate is less than or equal to the MBR.

Step s504 comprises scheduling, based on the first ABRI, at least one of an UL transmission from the UE or a DL transmission to the UE. In some embodiments, the first ABRI is an UL ABRI, the first bit rate threshold is an UL bit rate threshold, and the PDU further comprises a DL ABRI, wherein i) the DL ABRI indicates that a DL aggregate bit rate for the UE is less than (or less than or equal to) a DL bit rate threshold, ii) the DL ABRI indicates that the DL aggregate bit rate for the UE is greater than (or greater than or equal to) the DL bit rate threshold, or iii) the DL ABRI specifies the DL aggregate bit rate. In such an embodiment, process 500 may also include the RPF scheduling, based on the DL ABRI, a downlink transmission for the UE.

Figure 6:
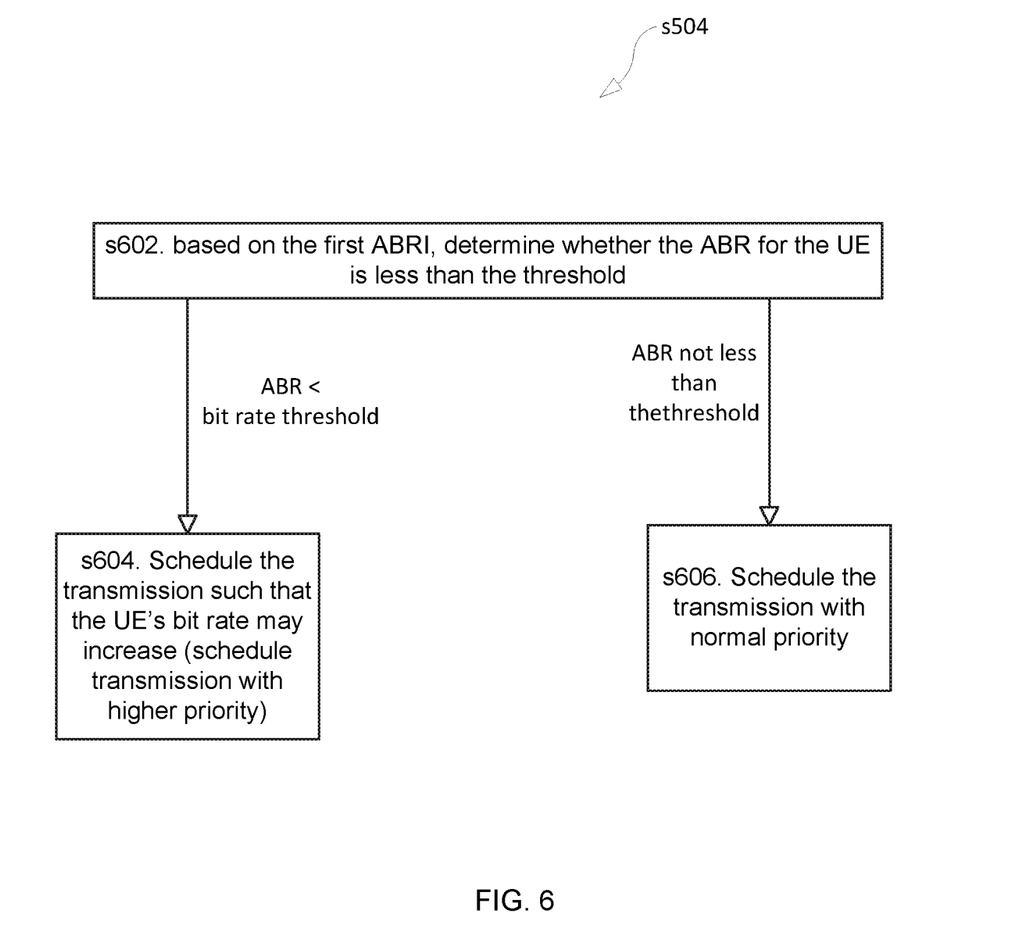
FIG. 6 is an exemplary flowchart illustrating a process, according to one embodiment.

FIG. 6 is a flowchart illustrating a process, according to an embodiment, for performing step s504. This embodiment assumes that the bit rate threshold is a minimum bit rate (MBR) threshold (i.e., the split bearer for the UE should have a bit rate that is at least as high as the MBR threshold). The process begins with steps s602, which comprises the RPF using the first ABRI to determine whether the ABR for the UE (i.e., the ABR for the UE's split bearer) is less than (or less than or equal to) the MBR threshold. If it is, then step s604 is performed, otherwise step s606 is performed. Step s604 comprises scheduling the transmission such that the UE's aggregate bit rate may increase (e.g., assign a higher priority to the transmission). Step s606 comprises scheduling the transmission with normal priority.

Figure 7:
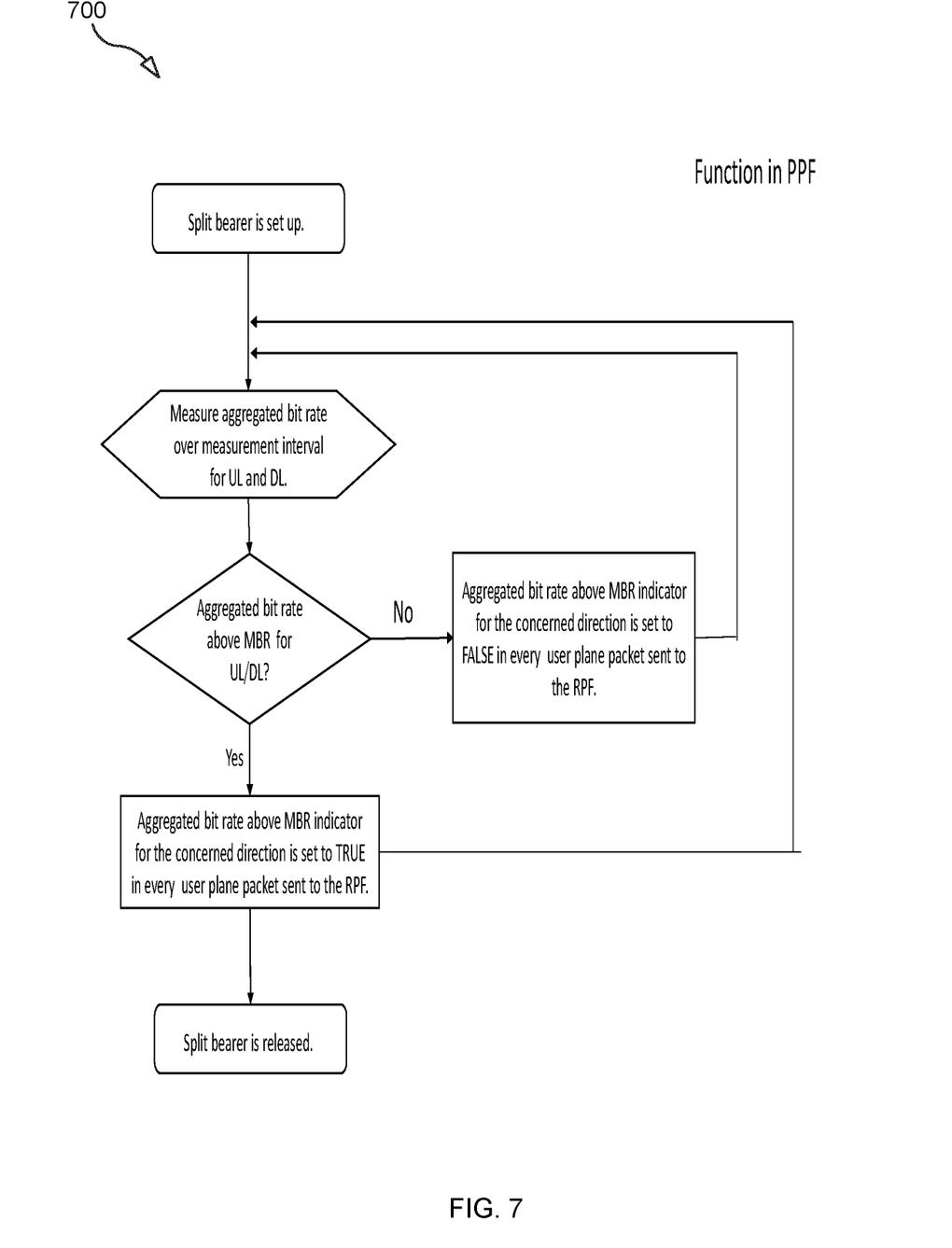
FIG. 7 is an exemplary flowchart illustrating a process, according to one embodiment.

FIG. 7 is a flow chart illustrating a process 700, according to an embodiment, that is performed by PPF 222. As shown in FIG. 7, in one embodiment, for every split bearer that is set up, the PPF continuously monitors the aggregate bit rate (ABR) in UL and DL for the split bearer. This can be done for example using an exponential moving average method. When an ABR measurement has been performed, the PPF evaluates if the ABR is below a specified minimum bit rate (MBR). The evaluation is done for UL and DL separately. The PPF will indicate to the RPF the outcome of the evaluation. That is, the PPF uses information elements in DL user data packets for the bearer to indicate to the RPF if the aggregate bit rates are below MBR or not. The information element (IE) is here referred to as "aggregate bit rate (ABR) indicator" IE. The ABR indicator IE may include separate ABR indicators for the UL and DL directions. Further it is here assumed that if an ABR indicator has the value TRUE, then this means the aggregate bit rate is not less than the MBR. The value TRUE will be set in every DL packet if a bit rate measurement does not give an aggregate bit rate below the MBR.

If a measurement indicates that the aggregate bit rate is below the MBR, the PPF will set the ABR indicator to FALSE. The value FALSE will then be set in every DL packet if a bit rate measurement does not give an aggregate bit rate not less than the MBR.

It can be that there are no user data packets being sent in the DL for a period. The PPF can then insert empty user data packets in the DL with the aggregate bit rate above MBR set to TRUE or FALSE.

Figure 8:
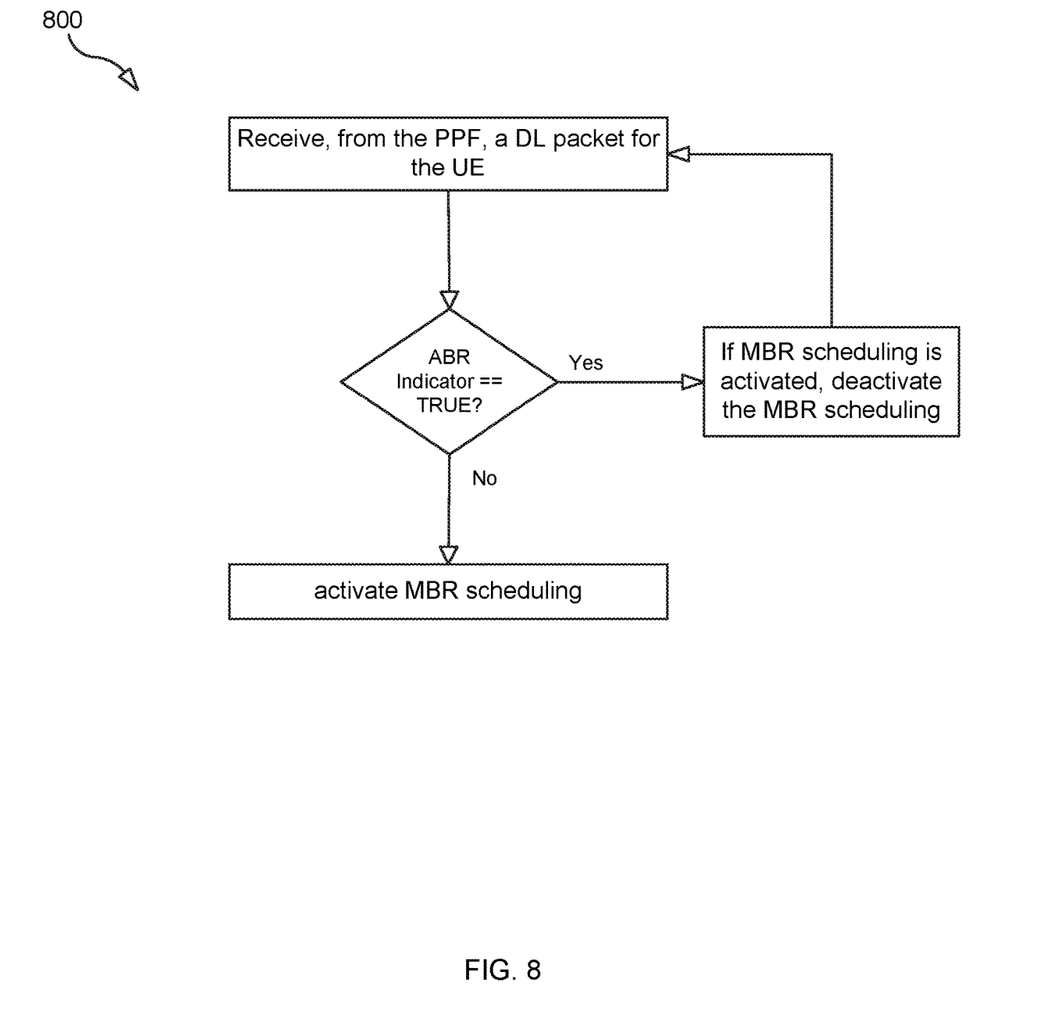
FIG. 8 is an exemplary flowchart illustrating a process, according to one embodiment.

FIG. 8 is a flow chart illustrating a process 800, according to an embodiment, that is performed by an RPF (e.g., RFP 214 or RPF 234) that is handling one leg of a split bearer. This embodiment assumes that at least one aggregate bit rate (ABR) indicator (e.g. an UL ABR indicator or a DL ABR indicator) is included in DL user data packets (e.g, NR-U PDUs) for the split bearer, which DL user data packets are received from PPF 222. It can be that a bearer is not a split bearer leg, and then the indicator will not be sent. Further, it can be that the PPF does not support to monitor the aggregate bit rate, and then the indicator will not be sent either. If an ABR indicator is included and has the value TRUE, the RPF will not apply minimum bit rate scheduling for the bearer in the concerned direction (e.g., in the UL direction if the ABR indicator is the UL ABR indicator). The RPF will then not elevate the scheduling priority even if the bit rate for the bearer leg controlled by the RPF is below the MBR.

If the aggregate bit rate indicator is included and has the value FALSE for the UL or DL, the RPF will activate "minimum bit rate scheduling" for the bearer and evaluate if the scheduling priority shall be elevated for the concerned direction. Even if the indicator has the value FALSE it is not necessarily so that the RPF will elevate the scheduling priority. It can be, for example, that the bit rate for the UL is below the MBR because of the UE has no data to send. For this reason, the scheduler monitors buffer status reports from the UE to find out if there is data to send and if the scheduling priority shall be elevated.

Figure 9:
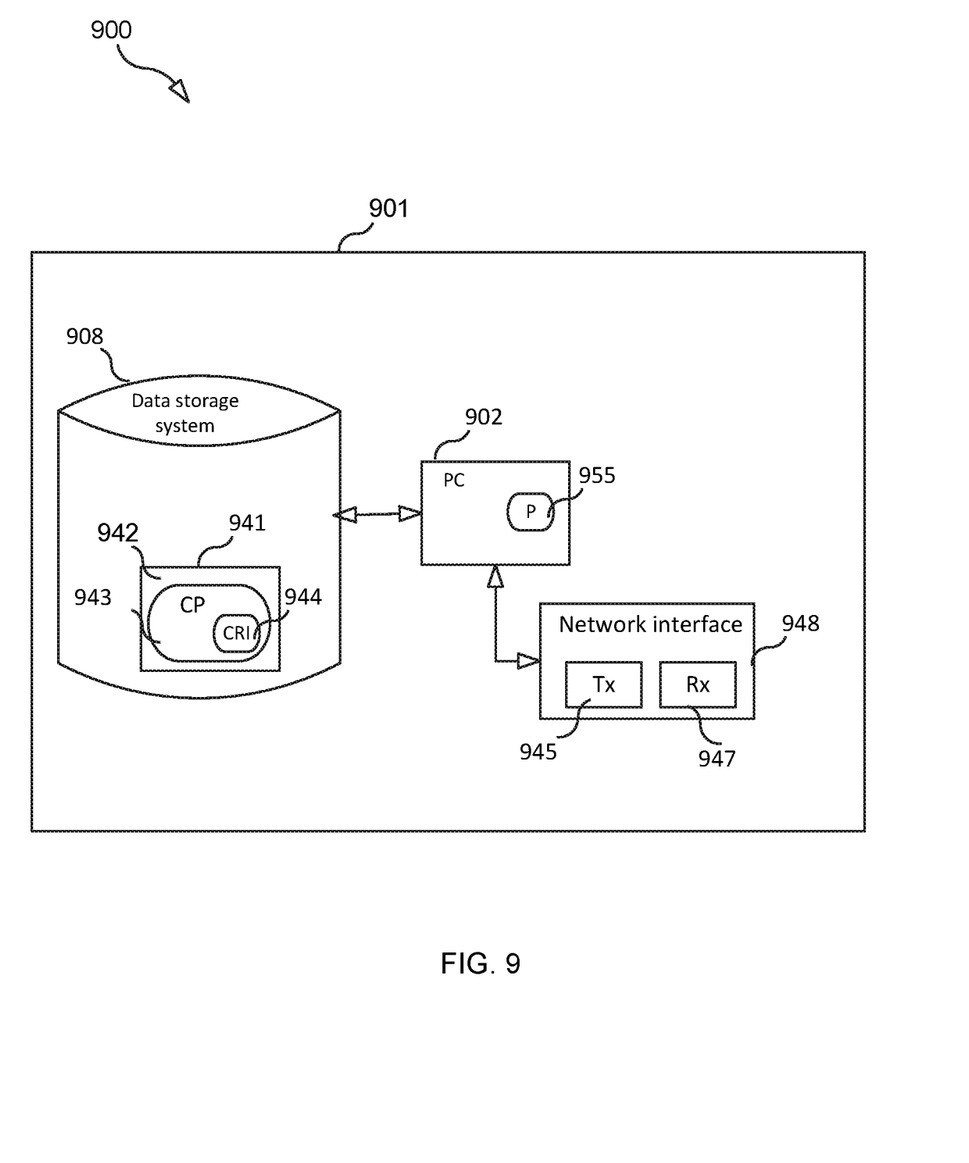
FIG. 9 is a block diagram of an apparatus according to one embodiment.

FIG. 9 is a block diagram of an apparatus 900, according to some embodiments, for performing the methods described herein. That is, apparatus 900 may implement PPF 222 or RPF 214/234. In embodiments where apparatus 900 implements PPF 222 apparatus 900 may be referred to as a "PPF apparatus 900" and in embodiments where apparatus 900 implements an RPF apparatus 900 may be referred to as a "RPF apparatus 900." As shown in FIG. 9, apparatus 900 may comprise: processing circuitry (PC) 902, which may include one or more processors (P) 955 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a network interface 948 comprising a transmitter (Tx) 945 and a receiver (Rx) 947 for enabling apparatus 900 to transmit data and receive data (e.g., wirelessly transmit/receive data); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes apparatus 900 to perform steps described herein (e.g., steps described herein with reference to the flow charts). In other embodiments, apparatus 900 may be configured to perform steps described herein without the need for code. That is, for example, PC 902 may consist merely of one or more ASICs. Hence, the features of the embodiments described herein may be implemented in hardware and/or software.

While various embodiments are described herein it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for use in scheduling one or both of transmissions to and transmissions from a user equipment, UE, the UE being able to communicate with a network via a first radio processing function, RPF, and the UE being able to communicate with the network via a second RPF that is separate from the first RPF, the method comprising:
determining a first aggregate bit rate for the UE;
sending to the first RPF first aggregate bit rate information, ABRI, for the UE, the first ABRI indicating that the first aggregate bit rate does not satisfy a bit rate threshold condition;
receiving a first protocol data unit, PDU, addressed to the UE and including user data; and
after receiving the first PDU, generating a second PDU comprising the user data and the first ABRI for the UE, sending the first ABRI for the UE to the first RPF including sending to the first RPF the second PDU comprising the user data and the first ABRI for the UE, the second PDU being a New Radio user plane, NR-U, PDU.

2. The method of claim 1, further comprising:
after determining the first aggregate bit rate, comparing the first aggregate bit rate to a bit rate threshold to determine whether or not the first aggregate bit rate satisfies the threshold condition, wherein the first ABRI one of:
i) indicates that the first aggregate bit rate satisfies the threshold condition; and
ii) indicates that the first aggregate bit rate does not satisfy the threshold condition.

3. The method of claim 2, wherein the first aggregate bit rate is an uplink, UL, aggregate bit rate, the method further comprises: i) receiving from the first RPF a first protocol data unit, PDU, comprising user data that was transmitted by the UE and ii) receiving from the second RPF a second PDU comprising user data that was transmitted by the UE; and
determining the first aggregate bit rate comprises: determining the amount of user data included in the first PDU; determining the amount of user data included in the second PDU; and using the determined amounts of user data in calculating the aggregate bit rate.

4. The method of claim 3, wherein the aggregate bit rate is determined based on an exponential moving average method.

5. The method of claim 2, wherein determining the aggregate bit rate comprises:
receiving, from the first RPF, first bitrate information specifying a first bit rate;
receiving, from the second RPF, second bitrate information specifying a second bit rate; and
determining the aggregate bit rate based on the first bit rate and the second bit rate.

6. The method of claim 1, wherein the first aggregate bit rate is an uplink, UL, aggregate bit rate, the method further comprises: i) receiving from the first RPF a first protocol data unit, PDU, comprising user data that was transmitted by the UE and ii) receiving from the second RPF a second PDU comprising user data that was transmitted by the UE; and
  determining the first aggregate bit rate comprises: determining the amount of user data included in the first PDU; determining the amount of user data included in the second PDU; and using the determined amounts of user data in calculating the aggregate bit rate.

7. The method of claim 6, wherein the aggregate bit rate is determined based on an exponential moving average method.

8. The method of claim 1, wherein determining the aggregate bit rate comprises:
  receiving, from the first RPF, first bitrate information specifying a first bit rate;
  receiving, from the second RPF, second bitrate information specifying a second bit rate; and
  determining the aggregate bit rate based on the first bit rate and the second bit rate.

9. The method of claim 1, wherein
  the first PDU is an Internet Protocol, IP, PDU, comprising an IP header and a payload, wherein the payload comprises the user data; and
  the second PDU is an NR-U PDU comprising a header containing the ABRI and a payload comprising a PDCP PDU containing the user data.

10. The method of claim 9, wherein
  the first aggregate bit rate is an uplink, UL, aggregate bit rate;
  the method further comprises:
    determining a downlink, DL, aggregate bit rate based on the amount of user data included in the first PDU; and
    generating second ABRI for the UE, wherein the second ABRI for the UE one of:
      i) indicates that the DL aggregate bit rate satisfies a bit rate threshold condition;
      ii) indicates that the DL aggregate bit rate does not satisfy the bit rate threshold condition; and
      iii) specifies the determined DL aggregate bit rate for the UE; and
  the second PDU comprises the user data, the first ABRI for the UE, and the second ABRI for the UE.

11. The method of claim 1, wherein
  the first aggregate bit rate is an uplink, UL, aggregate bit rate;
  the method further comprises:
    determining a downlink, DL, aggregate bit rate based on the amount of user data included in the first PDU; and
    generating second ABRI for the UE, wherein the second ABRI for the UE one of:
      i) indicates that the DL aggregate bit rate satisfies a bit rate threshold condition;
      ii) indicates that the DL aggregate bit rate does not satisfy the bit rate threshold condition and
      iii) specifies the determined DL aggregate bit rate for the UE; and
  the second PDU comprises the user data, the first ABRI for the UE, and the second ABRI for the UE.

12. The method of claim 1, further comprising:
  determining that no DL packets for the UE have been received within the last X units of time, wherein X is a predetermined number; and
  as a result of determining that no DL packets for the UE have been received within the last X units of time, generating a PDU that contains UL ABRI for the UE but that does not contain any user data for the UE and transmitting the generated PDU to the first RPF, wherein
  the UL ABRI one of:
    i) indicates that a calculated UL aggregate bit rate for the UE satisfies an UL bit rate threshold condition;
    ii) indicates that the calculated UL aggregate bit for the UE does not satisfy the UL bit rate threshold condition; and
    iii) specifies the calculated UL aggregate bit rate for the UE.

13. A method for use in scheduling one or both of transmissions to and transmissions from a user equipment, UE, the method comprising:
  receiving a protocol data unit, PDU, comprising DL user data for the UE and first aggregate bit rate information, ABRI, for the UE, the PDU being a New Radio user plane, NR-U, PDU, the PDU having been generated based on another PDU, the other PDU being addressed to the UE and comprising the user data and the ABRI; and
  scheduling, based on the first ABRI, at least one of an uplink, UL, transmission from the UE or a downlink, DL, transmission to the UE, the first ABRI indicating that the aggregate bit rate for the UE does not satisfy a bit rate threshold condition.

14. The method of claim 13, wherein
  the first ABRI indicates that an aggregate bit rate for the UE satisfies a bit rate threshold condition.

15. The method of claim 13, wherein scheduling based on the first ABRI comprises:
  determining that the first ABRI indicates that the aggregate bit rate for the UE is less than the first bit rate threshold; and
  as a result of determining that the first ABRI indicates that the aggregate bit rate for the UE is less than the first bit rate threshold, scheduling the transmission such that the UE's aggregate bit rate may increase.

16. The method of claim 15, wherein scheduling the transmission for the UE such that the UE's aggregate bit rate increases comprises elevating a scheduling priority for the UE.

17. The method of claim 13, wherein the first ABRI is an uplink, UL, ABRI, and the first bit rate threshold is an UL bit rate threshold;
  the PDU further comprises a DL ABRI, wherein one of:
    i) the DL ABRI indicates that a DL aggregate bit rate for the UE satisfies a DL bit rate threshold condition;
    ii) the DL ABRI indicates that the DL aggregate bit rate for the UE does not satisfy the DL bit rate threshold condition; and
    iii) the DL ABRI specifies the DL aggregate bit rate; and
  the method further comprises scheduling, based on the DL ABRI, a downlink transmission for the UE.

18. A packet processing function, PPF, apparatus, configured for use in scheduling one or both of transmissions to and transmissions from a user equipment, UE, the UE being able to communicate with a network via a first radio processing function, RPF, and the UE being able to communicate with the network via a second RPF that is separate from the first RPF, the PPF apparatus comprising processing circuitry; and a memory, the memory containing instructions executable by the processing circuitry, the PPF apparatus being configured to:
  determine a first aggregate bit rate for the UE;

send to the first RPF first aggregate bit rate information, ABRI, for the UE, the first ABRI indicating that the first aggregate bit rate does not satisfy a bit rate threshold condition;

receive a first protocol data unit, PDU, addressed to the UE and including user data; and after receiving the first PDU, generate a second PDU comprising the user data and the first ABRI for the UE, sending the first ABRI for the UE to the first RPF including sending to the first RPF the second PDU comprising the user data and the first ABRI for the UE, the second PDU being a New Radio user plane, NR-U, PDU.

19. A radio processing function, RPF, apparatus, for use in scheduling one or both of transmissions to and transmissions from a user equipment, UE, the RPF apparatus comprising processing circuitry; and a memory, the memory containing instructions executable by the processing circuitry, the RPF apparatus being configured to:

receive a protocol data unit, PDU, including DL user data for the UE and first aggregate bit rate information, ABRI, for the UE, the PDU being a New Radio user plane, NR-U, PDU, the PDU having been generated based on another PDU, the other PDU being addressed to the UE and comprising the user data and the ABRI; and schedule, based on the first ABRI, at least one of an uplink, UL, transmission from the UE or a downlink, DL, transmission to the UE, the first ABRI indicating that the aggregate bit rate for the UE does not satisfy a bit rate threshold condition.

* * * * *